UNITED STATES PATENT OFFICE.

JOHANN NICOLAUS ZEITLER, OF CANNSTADT, GERMANY.

PROCESS OF MAKING HARD POTASH SOAP.

SPECIFICATION forming part of Letters Patent No. 452,407, dated May 19, 1891.

Application filed May 23, 1890. Serial No. 352,946. (Specimens.)

*To all whom it may concern:*

Be it known that I, JOHANN NICOLAUS ZEITLER, a citizen of the Kingdom of Würtemberg, residing at Cannstadt, in Würtemberg, Germany, have invented a new and useful Improvement in the Process of Preparing Potash Soaps, of which the following is a specification.

A portion of the amount of potash lye of at least 30° Baumé, (although for the best qualities and particularly for a hard potash soap a lye of not less than 45° Baumé should be used,) in sufficient quantity for saponification, is first introduced into liquid animal or vegetable fat or resin or into a mixture of these substances and the mixture stirred thoroughly for a time. This causes an amount of heat to be evolved spontaneously from the mass itself without the aid of external heat, the mass being heated to a temperature of from 100° to 140° Celsius. A portion of the fat or mixture of fats is thus saponified as far as the amount of added lye permits. The saponification having been commenced in this way, either the entire remainder of the requisite amount of lye is added at once or the same is added in portions at intervals of from ten to twenty minutes until it has all been added, according as it is desired to carry out the process fast or slowly. In this manner by a proper addition of lye the temperature and through it the entire course of the reaction may be regulated with nicety. The mass must be thoroughly agitated during as well as after pouring in and until saponification has been completed. This completion of the saponification takes place in about ten minutes after the mass has reached 110° Celsius by self-heating—that is to say, when the same has boiled. After the mass begins to rise in the kettle the reaction proceeds with extraordinary swiftness and violence, and the saponification is completed when this reaction is over. The operation is finished in about one and one-half (1½) hour, and the product is faultless. The spontaneous or self heating increases in rapidity and intensity as the process of saponification is carried out on a larger scale, a more advantageous result being the consequence. Where fats or mixtures of fats are employed which are difficult of saponification, it is advisable to warm the same to about 50° or 60° Celsius before pouring in the lye, inasmuch as in this way the spontaneous heating to the above-mentioned temperature of from 100° to 140° Celsius can be attained more rapidly.

What I claim, and desire to secure by Letters Patent, is—

In the art of making hard potash soap, the process which consists in adding at intervals to fatty material in a liquid state portions of caustic potash solution of not less than 45° Baumé, with agitation of the mixture and without the application of external heat after the first portion of the caustic potash has been applied, substantially as described.

In testimony whereof I have signed this specification in the presence of two subscribing witnesses.

JOHANN NICOLAUS ZEITLER.

Witnesses:
  AUGUST B. DRAUTZ,
  GUSTAV GROSS.